United States Patent
Rofougaran

(10) Patent No.: US 7,697,914 B2
(45) Date of Patent: Apr. 13, 2010

(54) RADIO RECEIVER AND RADIO RECEIVER FRONT-END

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 685 days.

(21) Appl. No.: 11/513,685

(22) Filed: Aug. 30, 2006

(65) Prior Publication Data
US 2008/0057885 A1 Mar. 6, 2008

(51) Int. Cl.
*H04B 17/00* (2006.01)
(52) U.S. Cl. ........................ 455/305; 455/307
(58) Field of Classification Search .............. 455/295, 455/296, 302, 303, 304, 305, 306, 307; 370/348, 370/349, 351
See application file for complete search history.

(56) References Cited

U.S. PATENT DOCUMENTS 3,621,401 A * 11/1971 Young, Jr. .................. 455/303
6,151,373 A * 11/2000 Dodley ....................... 455/307
6,967,619 B2 * 11/2005 Khoo et al. ................. 455/302

FOREIGN PATENT DOCUMENTS

| JP | 2000-13262 | 1/2000 |
| JP | 2000-151436 | 5/2000 |

* cited by examiner

*Primary Examiner*—Thanh C Le
(74) *Attorney, Agent, or Firm*—Garlick Harrison & Markison

(57) ABSTRACT

A radio receiver front-end includes first and second RF receiver sections and an RF combining module. The first RF receiver section is coupled to receive an inbound RF signal and provide to a first representation of the inbound RF signal, wherein the inbound RF signal includes a desired signal component and an undesired signal component. The second RF receiver section is coupled to receive the inbound RF signal and to provide a second representation of the inbound RF signal. The RF combining module is coupled to combine the first and second representations of the inbound RF signal to produce a desired RF signal, wherein the desired RF signal includes the desired signal component and an attenuated representation of the undesired signal component.

4 Claims, 7 Drawing Sheets

RADIO RECEIVER AND RADIO RECEIVER FRONT-END

CROSS REFERENCE TO RELATED PATENTS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communications systems and more particularly to radio receivers used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a receiver to reliably recover data from received inbound RF signals it must be able to isolate desired signal components of the inbound RF signals from interferers (e.g., interference from adjacent channel(s), interference from other devices and/or systems using frequencies near the frequency band of interest, and/or transmission blocking signals that occur in RFID systems). For example, in a cellular system, it is fairly common to have significant nearby interferers of the frequency band of interest (e.g., one or more desired channel(s) of 5-60 MHz centered at a frequency of about 900 MHz, 1800 MHz, 1900 MHz, and/or 2100 MHz) that adversely affect the ability of a receiver to accurately recover data.

One solution to reduce the adverse affects caused by interferers is to use an off-chip band pass filter (BPF) prior to the LNA to attenuate the interferers and pass the desired channel (s). However, with nearby interferers (e.g., within 100 MHz), the BPF needs a steep roll off to sufficiently attenuate the interferers making it an expensive part. In addition, an off-chip BPF typically reduces the magnitude of the desired channel(s) by about 3 dB.

Another solution is to use a less expensive BPF with less roll off. While this reduces the cost and the attenuation of the desired channel(s), it does not sufficiently attenuate large nearby interferers.

Therefore, a need exists for a radio receiver and radio receiver front-end that sufficiently attenuated interferers without the use of costly BPFs and with negligible attenuation of the desired channel(s).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
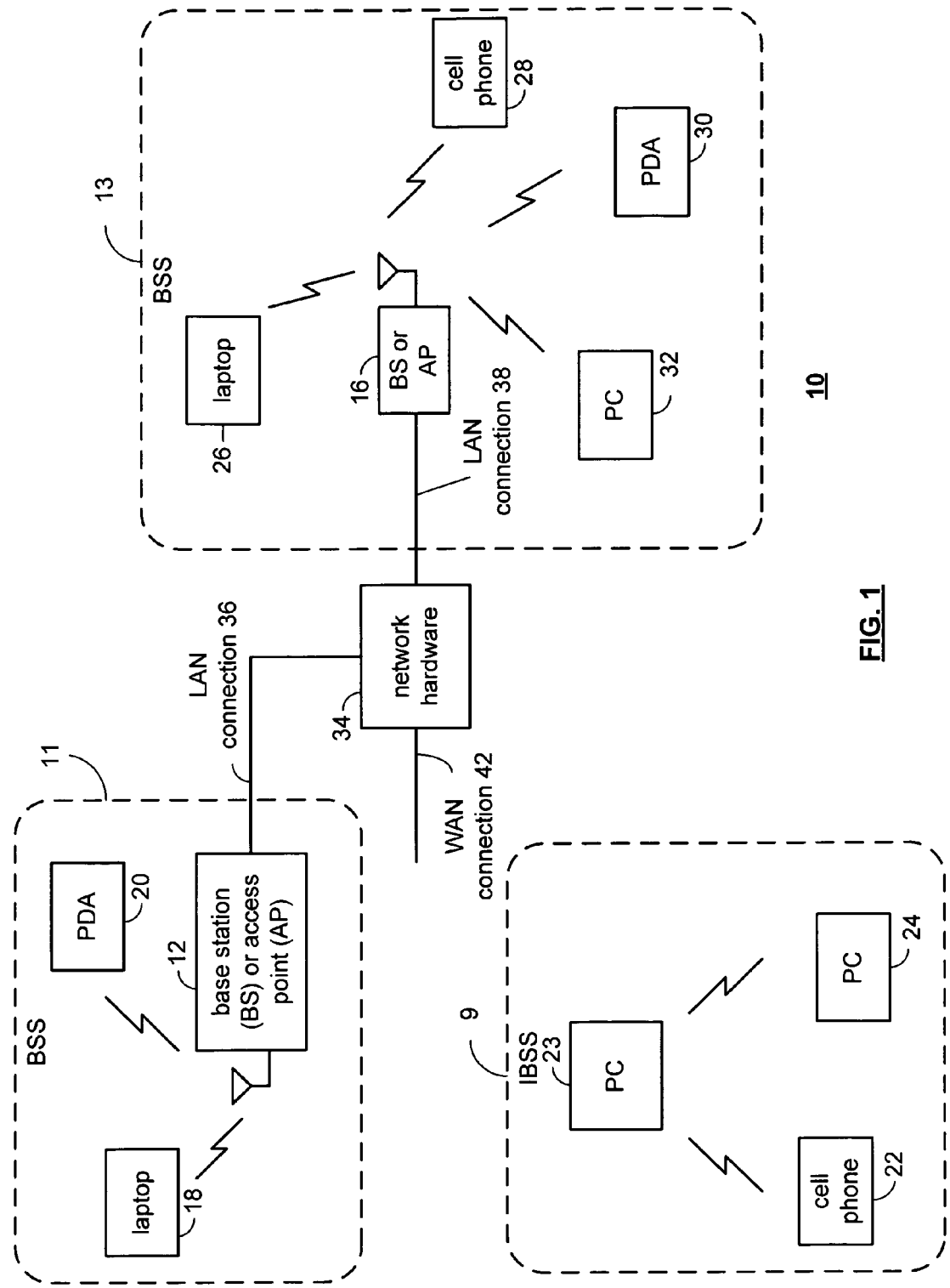
FIG. 1 is a schematic block diagram of a wireless communication system in accordance with the present invention.

FIG. 1 is a schematic block diagram illustrating a communication system 10 that includes a plurality of base stations and/or access points 12, 16, a plurality of wireless communication devices 18-32 and a network hardware component 34. Note that the network hardware 34, which may be a router, switch, bridge, modem, system controller, et cetera provides a wide area network connection 42 for the communication system 10. Further note that the wireless communication devices 18-32 may be laptop host computers 18 and 26, personal digital assistant hosts 20 and 30, personal computer hosts 24 and 32 and/or cellular telephone hosts 22 and 28 that include a wireless transceiver. The details of the wireless transceiver will be described in greater detail with reference to FIGS. 3-7.

Wireless communication devices 22, 23, and 24 are located within an independent basic service set (IBSS) area and communicate directly (i.e., point to point). In this configuration, these devices 22, 23, and 24 may only communicate with each other. To communicate with other wireless communication devices within the system 10 or to communicate outside of the system 10, the devices 22, 23, and/or 24 need to affiliate with one of the base stations or access points 12 or 16.

The base stations or access points 12, 16 are located within basic service set (BSS) areas 11 and 13, respectively, and are operably coupled to the network hardware 34 via local area network connections 36, 38. Such a connection provides the base station or access point 12 16 with connectivity to other devices within the system 10 and provides connectivity to other networks via the WAN connection 42. To communicate with the wireless communication devices within its BSS 11 or 13, each of the base stations or access points 12-16 has an associated antenna or antenna array. For instance, base station or access point 12 wirelessly communicates with wireless communication devices 18 and 20 while base station or access point 16 wirelessly communicates with wireless communication devices 26-32. Typically, the wireless communication devices register with a particular base station or access point 12, 16 to receive services from the communication system 10.

Typically, base stations are used for cellular telephone systems and like-type systems, while access points are used for in-home or in-building wireless networks (e.g., IEEE 802.11 and versions thereof, Bluetooth, RFID, and/or any other type of radio frequency based network protocol). Regardless of the particular type of communication system, each wireless communication device includes a built-in radio and/or is coupled to a radio. Note that one or more of the wireless communication devices may include an RFID reader and/or an RFID tag.

Figure 2:
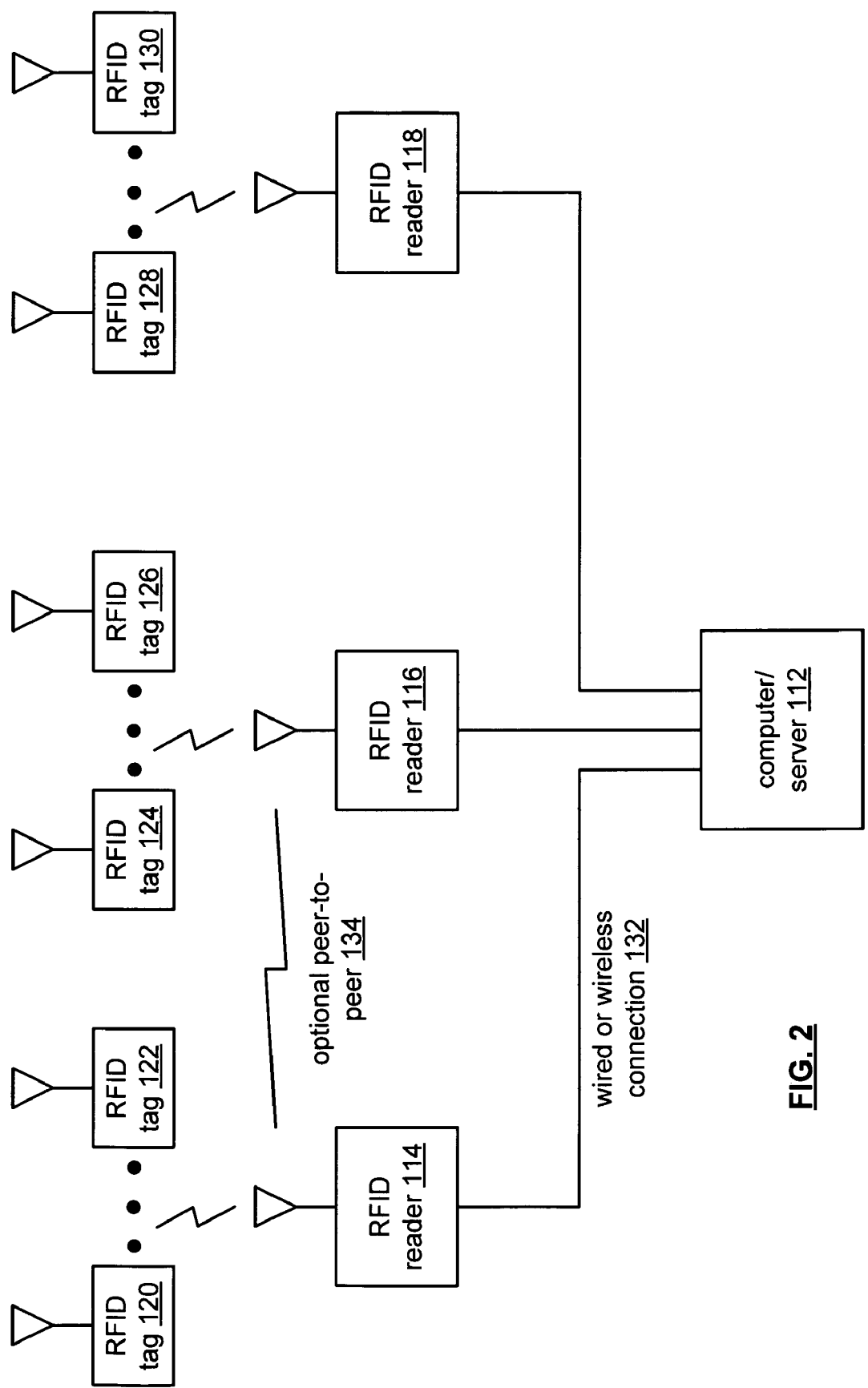
FIG. 2 is a schematic block diagram of a radio frequency identification system in accordance with the present invention.

FIG. 2 is a schematic block diagram of an RFID (radio frequency identification) system that includes a computer/server 112, a plurality of RFID readers 114-118 and a plurality of RFID tags 120-130. The RFID tags 120-130 may each be associated with a particular object for a variety of purposes including, but not limited to, tracking inventory, tracking status, location determination, assembly progress, et cetera.

Each RFID reader 114-118 wirelessly communicates with one or more RFID tags 120-130 within its coverage area. For example, RFID reader 114 may have RFID tags 120 and 122 within its coverage area, while RFID reader 116 has RFID tags 124 and 126, and RFID reader 118 has RFID tags 128 and 130 within its coverage area. The RF communication scheme between the RFID readers 114-118 and RFID tags 120-130 may be a backscattering technique whereby the RFID readers 114-118 provide energy to the RFID tags via an RF signal. The RFID tags derive power from the RF signal and respond on the same RF carrier frequency with the requested data.

In this manner, the RFID readers 114-118 collect data as may be requested from the computer/server 112 from each of the RFID tags 120-130 within its coverage area. The collected data is then conveyed to computer/server 112 via the wired or wireless connection 132 and/or via the peer-to-peer communication 134. In addition, and/or in the alternative, the computer/server 112 may provide data to one or more of the RFID tags 120-130 via the associated RFID reader 114-118. Such downloaded information is application dependent and may vary greatly. Upon receiving the downloaded data, the RFID tag would store the data in a non-volatile memory.

As indicated above, the RFID readers 114-118 may optionally communicate on a peer-to-peer basis such that each RFID reader does not need a separate wired or wireless connection 132 to the computer/server 112. For example, RFID reader 114 and RFID reader 116 may communicate on a peer-to-peer basis utilizing a back scatter technique, a wireless LAN technique, and/or any other wireless communication technique. In this instance, RFID reader 116 may not include a wired or wireless connection 132 to computer/server 112. Communications between RFID reader 116 and computer/server 112 are conveyed through RFID reader 114 and the wired or wireless connection 132, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 2 may be expanded to include a multitude of RFID readers 114-118 distributed throughout a desired location (for example, a building, office site, et cetera) where the RFID tags may be associated with equipment, inventory, personnel, et cetera. Note that the computer/server 112 may be coupled to another server and/or network connection to provide wide area network coverage.

Figure 3:
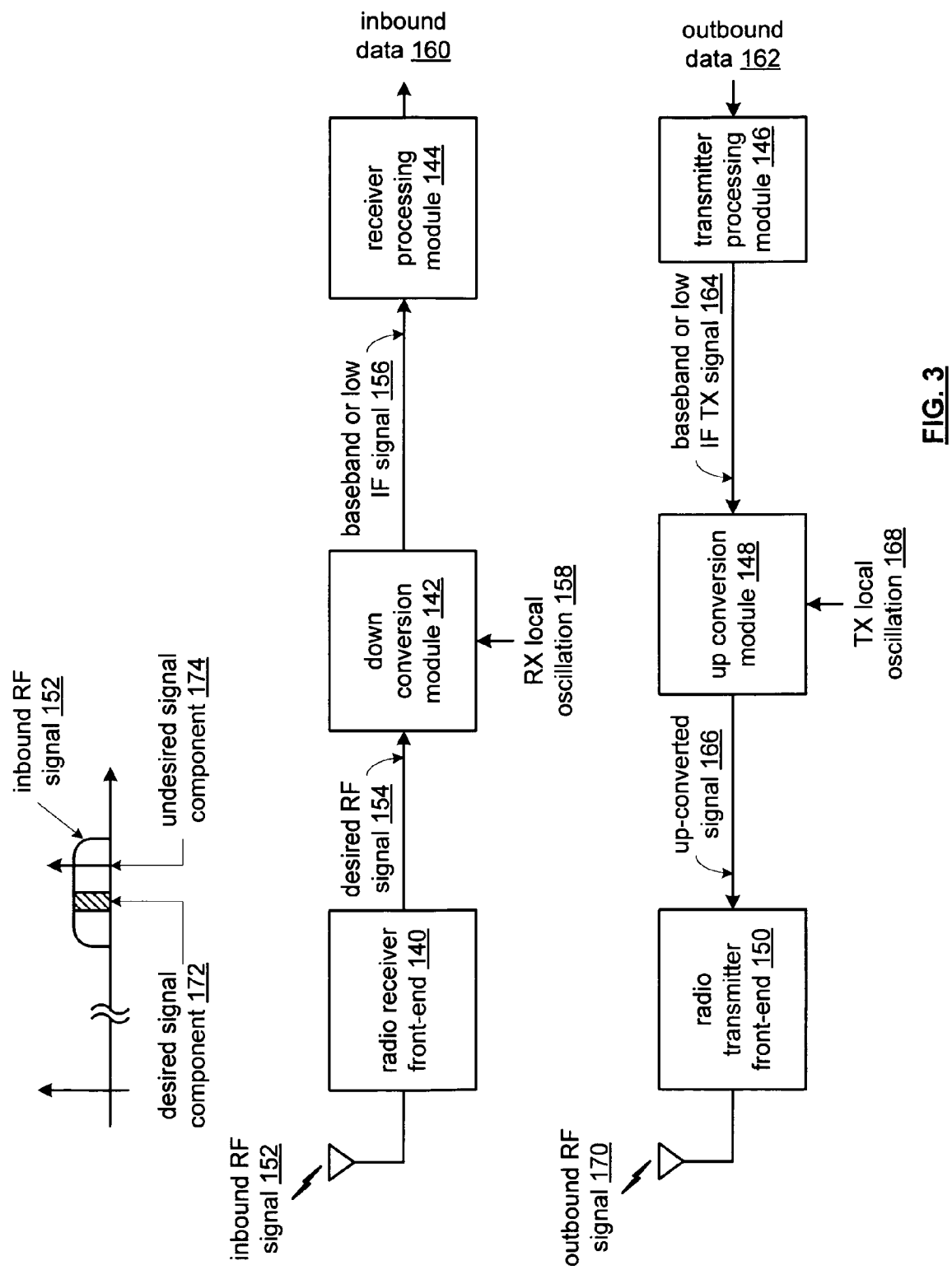
FIG. 3 is a schematic block diagram of a wireless communication device in accordance with the present invention.

FIG. 3 is a schematic block diagram of a wireless transceiver, which may be incorporated in an access point or base station 12 and 16 of FIG. 1, in one or more of the wireless communication devices 18-32 of FIG. 1, in one or more of the RFID readers 114-118, and/or in one or more of RFID tags 120-130. The wireless transceiver includes a transmitter and a receiver. The receiver includes a radio receiver front-end 140, a down conversion module 142, and a receiver processing module 144. The transmitter includes a transmitter processing module 146, an up conversion module 148, and a radio transmitter front-end 150.

As shown, the receiver and transmitter are each coupled to an antenna, however, the receiver and transmitter may share a single antenna via a transmit/receive switch and/or transformer balun. In another embodiment, the receiver and transmitter may share a diversity antenna structure. In another embodiment, the receiver and transmitter may each use its own diversity antenna structure. In another embodiment, the receiver and transmitter may share a multiple input multiple output (MIMO) antenna structure. Accordingly, the antenna structure of the wireless transceiver will depend on the particular standard(s) to which the wireless transceiver is compliant.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation 168.

The radio transmitter front end 150 includes a power amplifier 84 and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a base station, an access point and/or another wireless communication device.

The receiver receives inbound RF signals 152 via the antenna structure, where a base station, an access point, or another wireless communication device transmitted the inbound RF signals 152. The antenna structure provides the inbound RF signals 152 to the receiver front-end 140, which will be described in greater detail with reference to FIGS. 4-7. In general, without the use of bandpass filters, the receiver front-end 140 blocks one or more undesired signals components 174 (e.g., one or more interferers) of the inbound RF signal 152 and passing a desired signal component 172 (e.g., one or more desired channels of a plurality of channels) of the inbound RF signal 152 as a desired RF signal 154.

The down conversion module 70 includes a mixing section, an analog to digital conversion (ADC) module, and may also include a filtering and/or gain module. The mixing section converts the desired RF signal 154 into an analog baseband or low IF signal based on a receiver local oscillation 158. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 4:
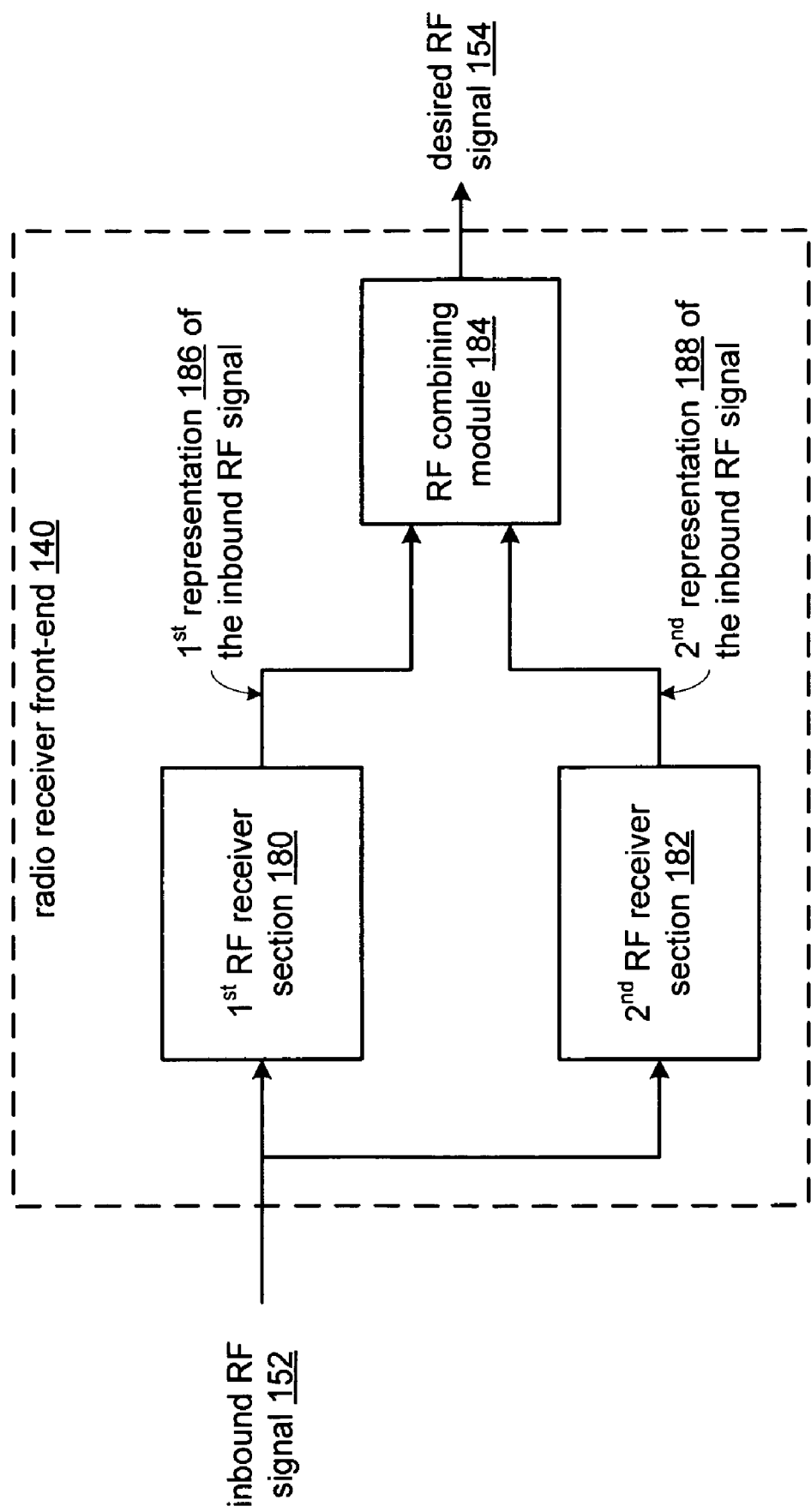
FIG. 4 is a schematic block diagram of an embodiment of a radio receiver front-end in accordance with the present invention.

FIG. 4 is a schematic block diagram of an embodiment of a radio receiver front-end 140 that includes a first radio frequency (RF) receiver section 180, a second RF receiver section 182, and an RF combining module 184. The first RF receiver section 180 is coupled to receive the inbound RF signal 152 and provide to a first representation 186 of the inbound RF signal. Note that the inbound RF signal 152 includes a desired signal component 172 and an undesired signal component 174.

The second RF receiver section 182 is coupled to receive the inbound RF signal 152 and to provide a second representation 188 of the inbound RF signal. The RF combining module 184 is coupled to combine the first and second representations 186 and 188 of the inbound RF signal to produce the desired RF signal 154. Note that the desired RF signal 154 includes the desired signal component 172 and an attenuated representation (e.g., 10 dB or more) of the undesired signal component 174.

Figure 5:
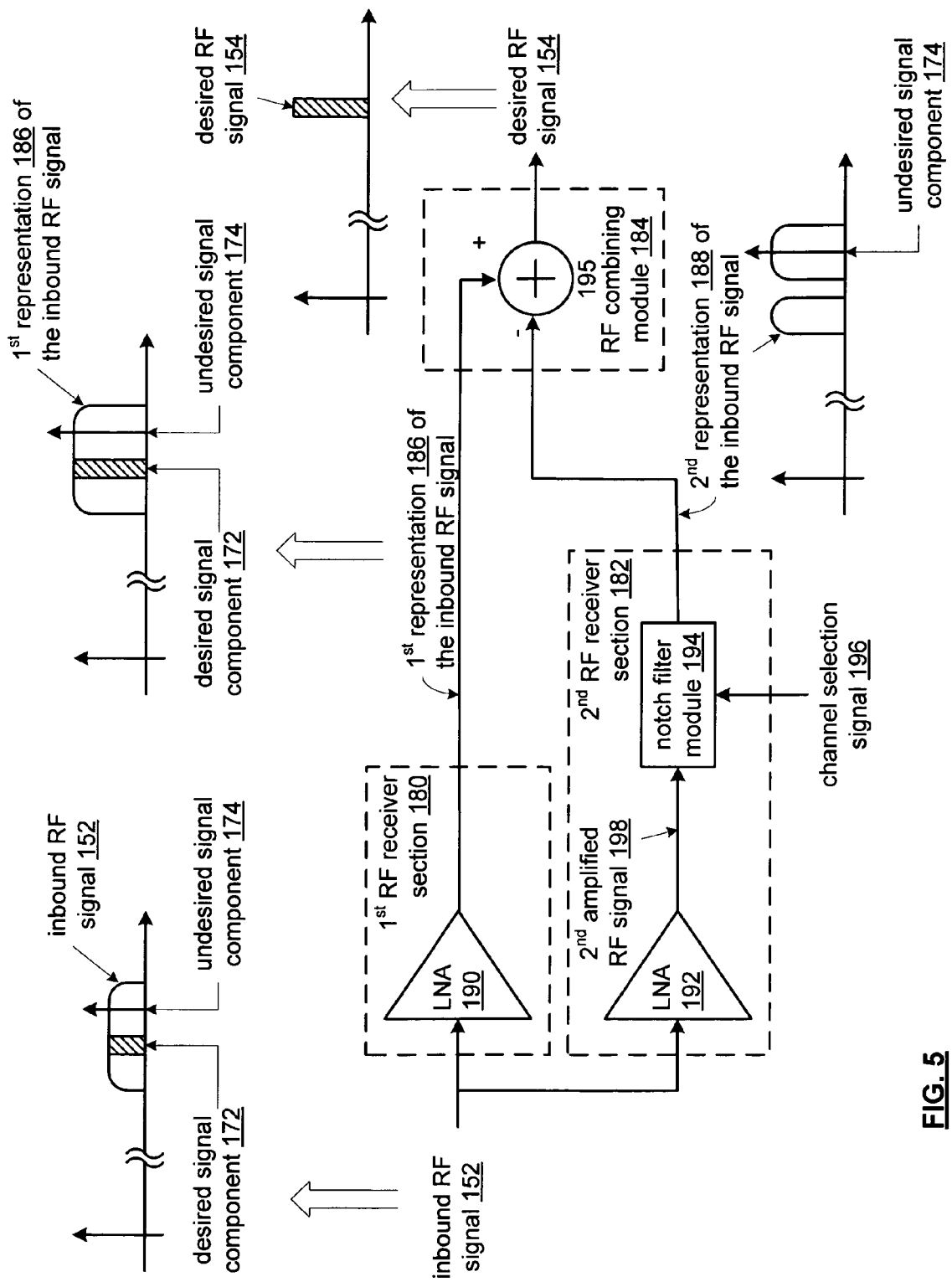
FIG. 5 is a schematic block diagram of another embodiment of a radio receiver front-end in accordance with the present invention.

FIG. 5 is a schematic block diagram of another embodiment of a radio receiver front-end 140 that includes a first RF receiver section 180, a second RF receiver section 182, and an RF combining module 184. In this embodiment, the first RF receiver section 180 includes a low noise amplifier (LNA) 190; the second RF receiver section 182 includes a LNA 192 and a notch filter module 194; and the RF combining module 194 includes a subtraction module.

The LNA 190 of the first RF receiver section 180 amplifies the inbound RF signal 152 to produce the first representation 186 of the inbound RF signal. As shown, the first representation 186 of the inbound RF signal includes the desired signal component 172 (e.g., one or more desired channels) and the undesired signal component 174 (e.g., interferers), but at a different magnitude than the inbound RF signal 152. For example, the inbound RF signal 152 may be generated in accordance with a cellular system, as such, it includes a desired signal component 172 or a frequency band of interest (e.g., one or more desired channel(s) of 5-60 MHz centered at a frequency of about 900 MHz, 1800 MHz, 1900 MHz, and/or 2100 MHz) and may further include a significant nearby interferer(s) (e.g., interference from adjacent channel(s), interference from other devices and/or systems using frequencies near the frequency band of interest, and/or transmission blocking signals that occur in RFID systems). Note that the interferers may be at frequencies within a few hundred Mega Hertz from of the frequency of the desired signal component 172. Further note that the bandwidth of the received inbound RF signal 152 is at least partially dependent upon the bandwidth of the LNAs 190 and 192.

LNA 192 of the second RF receiver section 182 amplifies the inbound RF signal 152 to produce a second amplified RF signal 198. The level of amplification used by LNA 192 is substantially equal to the level of amplification used by LNA 190 such that the second amplified RF signal 198 is substantially equal to the first representation 186 of the inbound RF signal.

The notch filter module 194, which may include one or more notch filters having a total roll off of 40 dB or more, notch filters the second amplified RF signal 198 to produce the second representation 188 of the inbound RF signal. The properties of the notch filter module 194 are such that the desired signal component 172 is substantially attenuated while the remaining portion of the inbound RF signal 152, including the undesired signal component 174, is passed substantially unattenuated as shown. Note that the notch filter module 194 may be adjustable, where the notch filter adjustment is based on a channel selection signal 196. As such, the notch filter module 194 may be tuned to accommodate different channels of a plurality of channels.

In another embodiment, the notch filter module 194 may include a mixer that down-converts the second amplified RF signal 198 to a baseband signal or an intermediate frequency (IF) signal. The notch filter module 194 further includes a notch filter, low pass filter, and/or high pass filter coupled to filter the baseband signal or IF signal such that the baseband or IF representation of the desired signal component 172 is attenuated while the baseband or IF representation of the undesired signal component 174 is passed substantially unattenuated. The notch filter module 194 further includes a second mixer that mixes the baseband or IF representation of the undesired signal component 172 with an RF or IF oscillation to produce the second representation 188 of the inbound RF signal.

The subtraction module 195 of the RF combining module 184 subtracts the second representation 188 of the inbound RF signal from the first representation 186 of the inbound RF signal to produce the desired RF signal 154. As such, the desired RF signal 154 includes the desired signal component 172 and minimal other portions of the inbound RF signal, including the undesired signal component 174. Thus, the interferers are substantially attenuated without the use of bandpass filters and without the up to 3 dB loss of the desired signal component associated with the use of bandpass filters.

Figure 6:
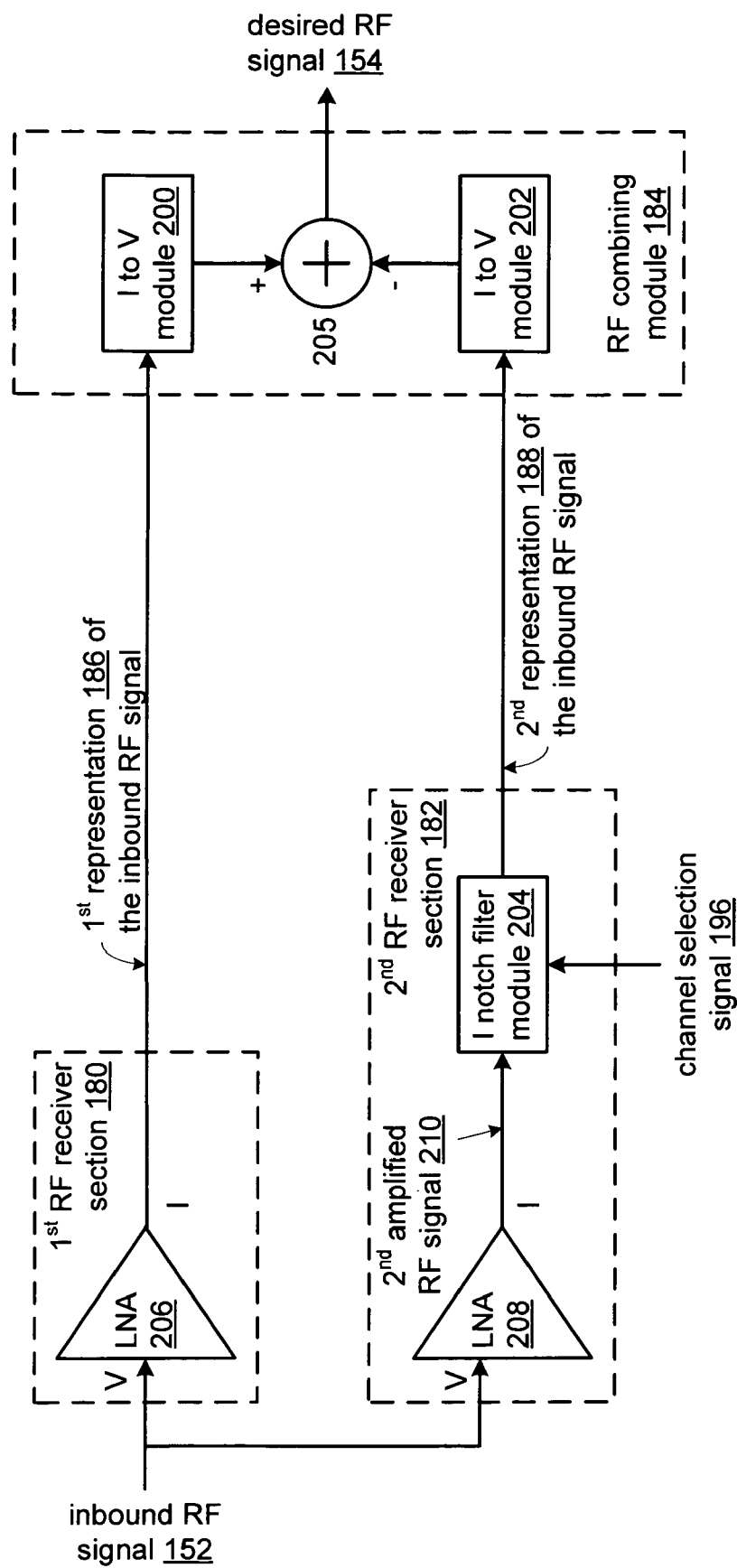
FIG. 6 is a schematic block diagram of another embodiment of a radio receiver front-end in accordance with the present invention.

FIG. 6 is a schematic block diagram of another embodiment of a radio receiver front-end 140 that includes a first RF receiver section 180, a second RF receiver section 182, and an RF combining module 184. In this embodiment, the first RF receiver section 180 includes a transconductance low noise amplifier (LNA) 206; the second RF receiver section 182 includes a transconductance LNA 208 and a current based notch filter module 204; and the RF combining module 194 includes a pair of current to voltage conversion modules 200 and 202 and a subtraction module 205.

The transconductance LNA 206 of the first RF receiver section 180 amplifies the inbound RF signal 152 to produce the first representation 186 of the inbound RF signal. In this embodiment, the first representation 186 of the inbound RF signal is a current-based (I) signal while the inbound RF signal 152 is a voltage-based (V) signal. As such, the first representation 186 of the inbound RF signal includes the desired signal component 172 (e.g., one or more desired channels) and the undesired signal component 174 (e.g., interferers).

Transconductance LNA 208 of the second RF receiver section 182 amplifies the inbound RF signal 152 to produce a second amplified RF signal 210, where the second amplified RF signal 210 is a current-based (I) signal. The level of amplification used by LNA 208 is substantially equal to the level of amplification used by LNA 206 such that the second amplified RF signal 210 is substantially equal to the first representation 186 of the inbound RF signal.

The current-based (I) notch filter module 204, which may include one or more notch filters having a total roll off of 40 dB or more, notch filters the second amplified RF signal 210 to produce the second representation 188 of the inbound RF signal. The properties of the notch filter module 204 are such that the desired signal component 172 is substantially attenuated while the remaining portion of the inbound RF signal 152, including the undesired signal component 174, is passed substantially unattenuated. Note that the notch filter module 204 may be adjustable, where the notch filter adjustment is based on a channel selection signal 196. As such, the notch filter module 204 may be tuned to accommodate different channels of a plurality of channels.

The current (I) to voltage (V) module 200, which may be implemented via a transistor, a cascode transistor pair, or any circuit that converts a current-based signal into a voltage-based signal, converts the first representation 186 of the inbound RF signal into a voltage-based signal. The I to V module 200, which may be implemented via a transistor, a cascode transistor pair, or any circuit that converts a current-based signal into a voltage-based signal, converts the second representation 188 of the inbound RF signal into a voltage-based signal. The subtraction module 205 of the RF combining module 184 subtracts the second representation 188 of the inbound RF signal from the first representation 186 of the inbound RF signal to produce the desired RF signal 154. As such, the desired RF signal 154 includes the desired signal component 172 and minimal other portions of the inbound RF signal, including the undesired signal component 174. Thus, the interferers are substantially attenuated without the use of bandpass filters and without the up to 3 dB loss of the desired signal component associated with the use of bandpass filters.

Figure 7:
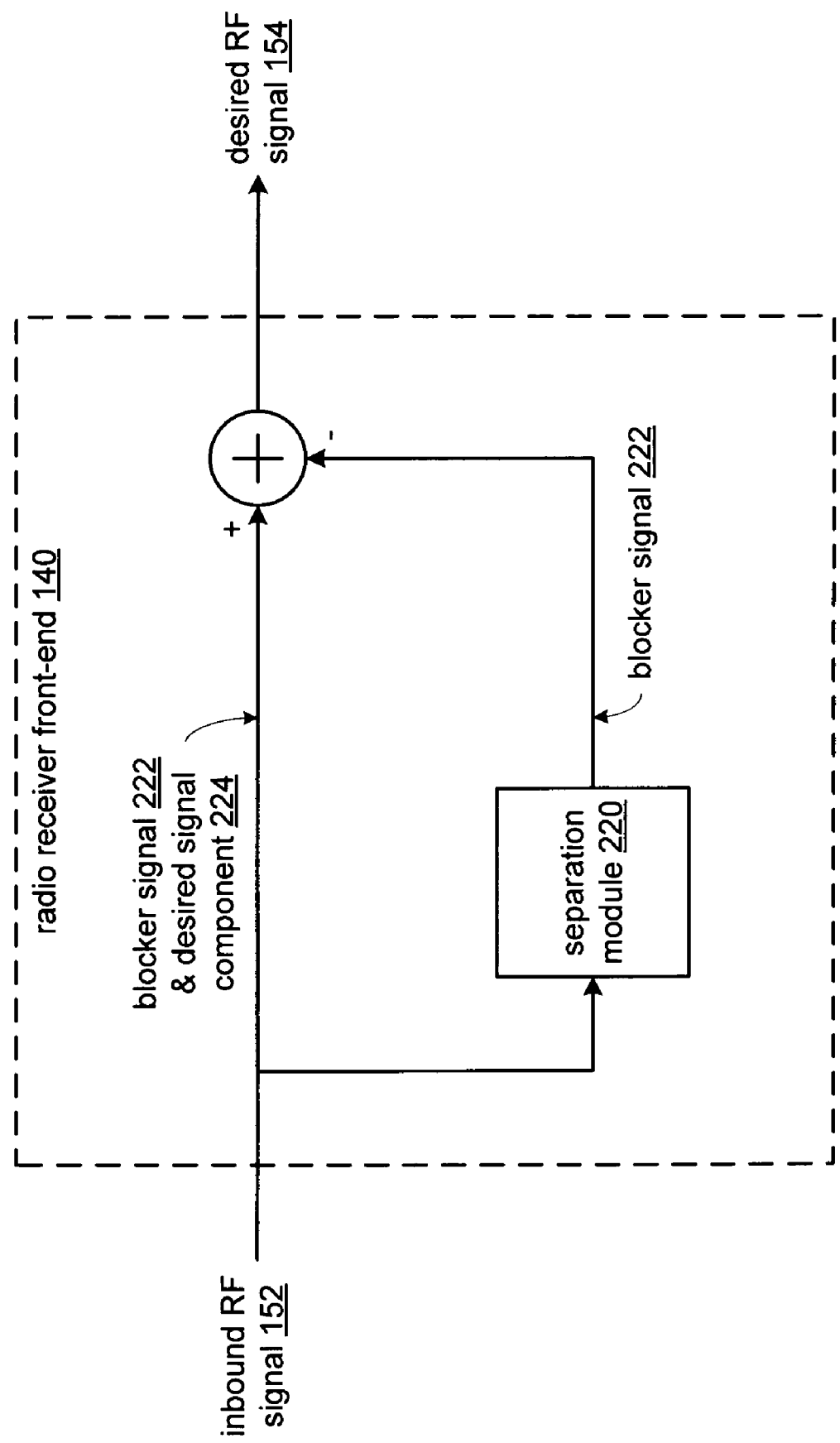
FIG. 7 is a schematic block diagram of another embodiment of a radio receiver front-end in accordance with the present invention.

FIG. 7 is a schematic block diagram of another embodiment of a radio receiver front-end 140 that functions to: receive an inbound radio frequency (RF) signal 152, wherein the inbound RF signal 152 includes a desired signal component 224 and a blocker signal 222; separate the blocker signal 222 from the desired signal component 224 to produce a separate blocker signal 222; and produce a desired RF signal 154 from the inbound RF signal 152 and the separate blocker signal 222. In this embodiment, the blocker signal 222 may be at or near the same frequency as the inbound RF signal 152, which is typically the case for RFID systems.

In an embodiment, the radio receiver front-end utilizes a separation module 220 to separate the blocker signal from the desired signal component. The separation module 220 amplifies the inbound RF signal to produce an amplified RF signal. The separation module 220 then notch filters the amplified RF signal to attenuate the desired signal component of the amplified RF signal and to pass, substantially unattenuated, the blocker signal of the amplified RF signal to produce the separate blocker signal. In another embodiment, the notch filtering includes: receiving a channel selection signal, wherein the desired signal component of the amplified RF signal corresponds to at least one desired channel of a plurality of channels and wherein the at least one desired channel is identified by the channel selection signal; and adjusting the notch filtering based on the channel selection signal.

In an embodiment, the radio receiver front-end produces the desired RF signal from the inbound RF signal and the separate blocker signal by: amplifying the inbound RF signal to produce an amplified RF signal; and subtracting the separate blocker signal from the amplified RF signal to produce the desired RF signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A radio receiver front-end comprises:
   a first radio frequency (RF) receiver section coupled to receive an inbound RF signal and to provide a first representation of the inbound RF signal, wherein the inbound RF signal includes a desired signal component and an undesired signal component, wherein the first RF receiver section includes a first transconductance low noise amplifier coupled to amplify the inbound RF signal to produce a first amplified current RF signal;
   a second RF receiver section coupled to receive the inbound RF signal and to provide a second representation of the inbound RF signal, the second RF receiver section includes:
      a second transconductance low noise amplifier coupled to amplify the inbound RF signal to produce a second amplified current RF signal; and
      a notch filter module coupled to notch filter the second amplified current RF signal to produce a notch filtered current RF signal, wherein the notch filtered current RF signal includes an attenuated desired signal component and a substantially unattenuated undesired signal component; and
   RF combining module coupled to the first RF receiver section and the second RF receiver section, the RF combining module includes:

a first current to voltage conversion module coupled to convert the first amplified current RF signal into an amplified voltage RF signal;

a second current to voltage conversion module coupled to convert the notch filtered current RF signal into a notch filtered voltage RF signal; and a subtraction module coupled to subtract the notch filtered voltage RF signal from the amplified voltage RF signal to produce a desired RF signal, in which the desired RF signal includes the desired signal component and an attenuated representation of the undesired signal component.

2. The radio receiver front-end of claim 1, wherein the notch filter module includes an adjustable notch filter coupled to notch filter the second amplified current RF signal based on a channel selection signal, wherein the desired signal component of the second amplified current RF signal corresponds to at least one desired channel of a plurality of channels and wherein the at least one desired channel is identified by the channel selection signal.

3. A radio receiver comprises:

radio receiver front-end that includes:

a first radio frequency (RF) receiver section coupled to receive an inbound RF signal and to provide a first representation of the inbound RF signal, wherein the inbound RF signal includes a desired signal component and an undesired signal component, wherein the first RF receiver section includes a first transconductance low noise amplifier coupled to amplify the inbound RF signal to produce a first amplified current RF signal;

a second RF receiver section coupled to receive the inbound RF signal and to provide a second representation of the inbound RF signal, the second RF receiver section includes:

a second transconductance low noise amplifier coupled to amplify the inbound RF signal to produce a second amplified current RF signal; and a notch filter module coupled to notch filter the second amplified current RF signal to produce a notch filtered current RF signal, wherein the notch filtered current RF signal includes an attenuated desired signal component and a substantially unattenuated undesired signal component; and RF combining module coupled to the first RF receiver section and the second RF receiver section, the RF combining module includes:

a first current to voltage conversion module coupled to convert the first amplified current RF signal into an amplified voltage RF signal;

a second current to voltage conversion module coupled to convert the notch filtered current RF signal into a notch filtered voltage RF signal; and a subtraction module coupled to subtract the notch filtered voltage RF signal from the amplified voltage RF signal to produce a desired RF signal, in which the desired RF signal includes the desired signal component and an attenuated representation of the undesired signal component;

down conversion module coupled to convert the desired RF signal into a baseband or low intermediate frequency (IF) signal based on a local oscillation; and receiver processing module coupled to convert the baseband or low IF signal into inbound data in accordance with at least one wireless communication protocol.

4. The radio receiver of claim 3 wherein the notch filter module includes an adjustable notch filter coupled to notch filter the second amplified current RF signal based on a channel selection signal, wherein the desired signal component of the second amplified current RF signal corresponds to at least one desired channel of a plurality of channels and wherein the at least one desired channel is identified by the channel selection signal.

\* \* \* \* \*